US012670518B2

(12) United States Patent
Manrique et al.

(10) Patent No.: US 12,670,518 B2
(45) Date of Patent: Jun. 30, 2026

(54) USER INTERFACE ARRANGING GROUPS OF ITEMS BY SIMILARITY FOR USER SELECTION

(71) Applicant: Maplebear Inc., San Francisco, CA (US)

(72) Inventors: Luis Manrique, New York, NY (US); Sanchit Gupta, Seattle, WA (US); Aref Kashani Nejad, Redmond, WA (US); Diego Goyret, Los Gatos, CA (US); Kurtis Mirick, Manhattan Beach, CA (US); Joshua Roberts, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 355 days.

(21) Appl. No.: 18/137,404

(22) Filed: Apr. 20, 2023

(65) Prior Publication Data

US 2024/0354828 A1 Oct. 24, 2024

(51) Int. Cl.
*G06Q 30/0601* (2023.01)
(52) U.S. Cl.
CPC ..... *G06Q 30/0631* (2013.01); *G06Q 30/0641* (2013.01)
(58) Field of Classification Search
CPC ........... G06Q 30/0631; G06Q 30/0639; G06Q 30/0641
See application file for complete search history.

(56) References Cited

U.S. PATENT DOCUMENTS

| | | | | |
|---|---|---|---|---|
| 9,904,949 | B1 * | 2/2018 | Tavernier | ........... G06Q 30/0631 |
| 11,308,537 | B1 * | 4/2022 | Bell | ................. G06Q 30/0629 |
| 2011/0061011 | A1 * | 3/2011 | Hoguet | .............. G06Q 30/0603 |
| | | | | 715/769 |

(Continued)

OTHER PUBLICATIONS

S. Rao and L. Zhang, "The Algorithms That Make Instacart Roll: How Machine Learning And Other Tech Tools Guide Your Groceries From Store To Doorstep," in IEEE Spectrum, vol. 58, No. 3, pp. 36-42, Mar. 2021, doi: 10.1109/MSPEC.2021.9370062. keywords: {Schedules;Distance learning;Refrigerators;Faces}, (Year: 2021).*

(Continued)

*Primary Examiner* — Michael Misiaszek
(74) *Attorney, Agent, or Firm* — Fenwick & West LLP

(57) ABSTRACT

An online system receives a request from a user to access an ordering interface for a retailer and identifies a retailer location based on the user's location. The system uses a machine learning model to predict availabilities of items at the retailer location and identifies anchor items the user previously ordered from the retailer that are likely available. The system computes a first score for each anchor item based on an expected value associated with it and/or a likelihood the user will re-order it, determines categories associated with the anchor items, and ranks the categories based on the first score. For each category, the system identifies associated candidate items likely to be available and ranks them based on a second score for each candidate item computed based on a probability of user satisfaction with it as an anchor item replacement. The ordering interface is then generated based on the rankings.

20 Claims, 7 Drawing Sheets

(56) References Cited

U.S. PATENT DOCUMENTS

| | | | | |
|---|---|---|---|---|
| 2013/0268317 A1* | 10/2013 | Mattila | ............... | G06Q 30/0631 |
| | | | | 705/26.7 |
| 2022/0092670 A1* | 3/2022 | Laserson | ................ | G06Q 30/06 |
| 2022/0188906 A1* | 6/2022 | Lacy | .................. | G06Q 30/0641 |
| 2023/0111745 A1* | 4/2023 | Kruck | ................ | G06Q 30/0631 |
| | | | | 705/26.7 |
| 2023/0222566 A1* | 7/2023 | Herd | .................. | G06Q 30/0643 |
| | | | | 705/26.81 |
| 2024/0070745 A1* | 2/2024 | Karikurve | .......... | G06Q 30/0625 |
| 2024/0232980 A1* | 7/2024 | Wen | ................... | G06Q 30/0631 |

OTHER PUBLICATIONS

Vanderschantz, N., & Sijnja, N. (2020). Swipe, scroll, add-to-cart: a case study of e-commerce gallery designs for small screen devices. In DRS2020: Synergy (pp. 2065-2082). Brisbane, Australia: Design Research Society. (Year: 2020).*

Embar, Varun R., Jay Pujara and Lise Getoor. "Aligning Product Categories using Anchor Products." KBCOM' 18, Feb. 2018, Los Angeles, California USA. (Year: 2018).*

* cited by examiner

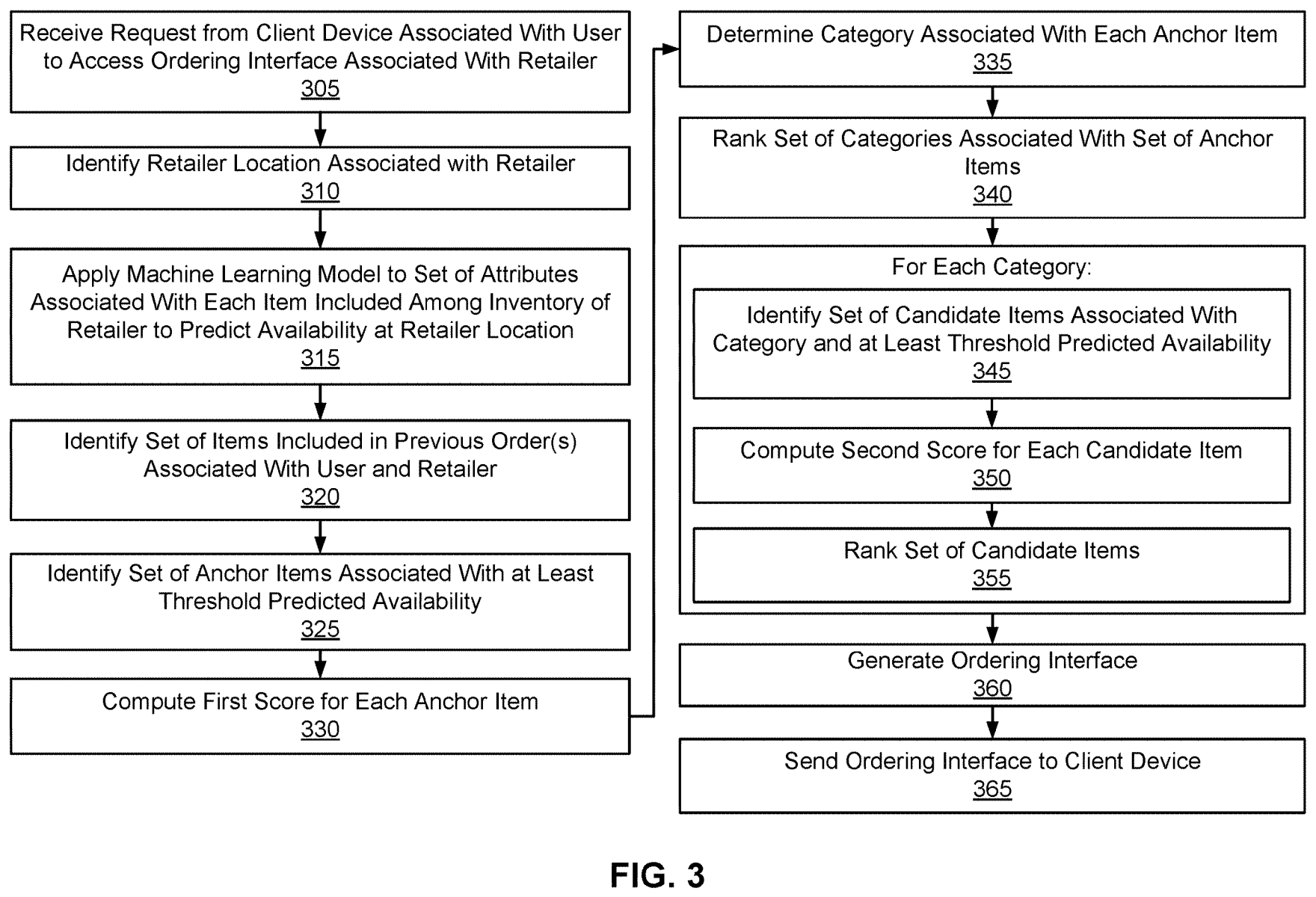

Receive Request from Client Device Associated With User to Access Ordering Interface Associated With Retailer
305

Identify Retailer Location Associated with Retailer
310

Apply Machine Learning Model to Set of Attributes Associated With Each Item Included Among Inventory of Retailer to Predict Availability at Retailer Location
315

Identify Set of Items Included in Previous Order(s) Associated With User and Retailer
320

Identify Set of Anchor Items Associated With at Least Threshold Predicted Availability
325

Compute First Score for Each Anchor Item
330

Determine Category Associated With Each Anchor Item
335

Rank Set of Categories Associated With Set of Anchor Items
340

For Each Category:

Identify Set of Candidate Items Associated With Category and at Least Threshold Predicted Availability
345

Compute Second Score for Each Candidate Item
350

Rank Set of Candidate Items
355

Generate Ordering Interface
360

Send Ordering Interface to Client Device
365

FIG. 3

USER INTERFACE ARRANGING GROUPS OF ITEMS BY SIMILARITY FOR USER SELECTION

BACKGROUND

Online systems, such as online concierge systems and online retailers, provide customers with the convenience of placing orders that are subsequently fulfilled on their behalf and delivered to them. The online systems may present ordering interfaces associated with retailers to their customers that allow the customers to browse or search for items, select items they would like to purchase, and place orders including the items they have selected for purchase. The customers may browse items by category or search for specific items in the ordering interfaces by interacting with menus, text fields, etc. For example, a customer may browse items presented upon selecting a category of items (e.g., "frozen desserts") from a menu in an ordering interface for a grocery store retailer or search for a specific item by typing its name or description into a field for search queries in the ordering interface and browsing the items returned in a list of search results.

However, customers may find it difficult and time-consuming to find items they are interested in purchasing in an ordering interface because unlike physical stores, which place similar items close to each other, allowing customers to easily find items or similar alternatives, items presented close to each other in an ordering interface may be unrelated. For example, the positions in which items are presented to a customer in an ordering interface may be based on paid search results, promotions for certain items, popularities of the items, frequencies with which the customer previously interacted with the items, likelihoods that the customer will purchase the items again, etc. In this example, if the customer is searching for an item from a list of items they previously purchased, each item in the list may be presented adjacent to unrelated items and the customer may have to scroll through several items before finding the item they were searching for. Furthermore, the customers may have to mentally switch between product categories as they do so, which may decrease their engagement with the items. As such, if the convenience provided by online systems is negated because customers have negative experiences searching for the items they would like to purchase, the customers may decide to stop placing orders with the online systems. Accordingly, it may be important to improve the interfaces implemented by such online systems.

SUMMARY

In accordance with one or more aspects of the disclosure, an online system generates an ordering interface based on a category-based ranking of previously ordered items and an item-based ranking of replacement items to improve the efficiency with which customers may search for items and increase customer engagement with the items. More specifically, an online system receives a request from a client device associated with a user to access an ordering interface associated with a retailer and identifies a retailer location associated with the retailer based at least in part on a geographical location associated with the user. The online system applies a machine learning model to a set of attributes associated with each item included among an inventory of the retailer to predict an availability of the item at the retailer location and identifies a set of items included in one or more previous orders associated with the user and the retailer. The online system then identifies, from the set of items, a set of anchor items associated with at least a threshold predicted availability at the retailer location. The online system computes a first score for each anchor item based at least in part on an expected value associated with the anchor item and/or a likelihood that the user will order the anchor item again, determines an item category associated with each anchor item, and ranks a set of item categories associated with the set of anchor items based at least in part on the first score. For each item category, the online system identifies a set of candidate items associated with the item category and at least the threshold predicted availability. For each item category, the online system also computes a second score for each candidate item based at least in part on a likelihood of satisfaction of the user with the candidate item as a replacement for an anchor item associated with the item category and ranks the set of candidate items based at least in part on the second score. The online system then generates the ordering interface based at least in part on the ranked set of item categories and the ranked set of candidate items and sends the ordering interface for display to the client device associated with the user.

BRIEF DESCRIPTION OF THE DRAWINGS

FIG. 3 is a flowchart of a method for generating an ordering interface based on a category-based ranking of previously ordered items and an item-based ranking of replacement items, in accordance with one or more embodiments.

DETAILED DESCRIPTION

Figure 1:
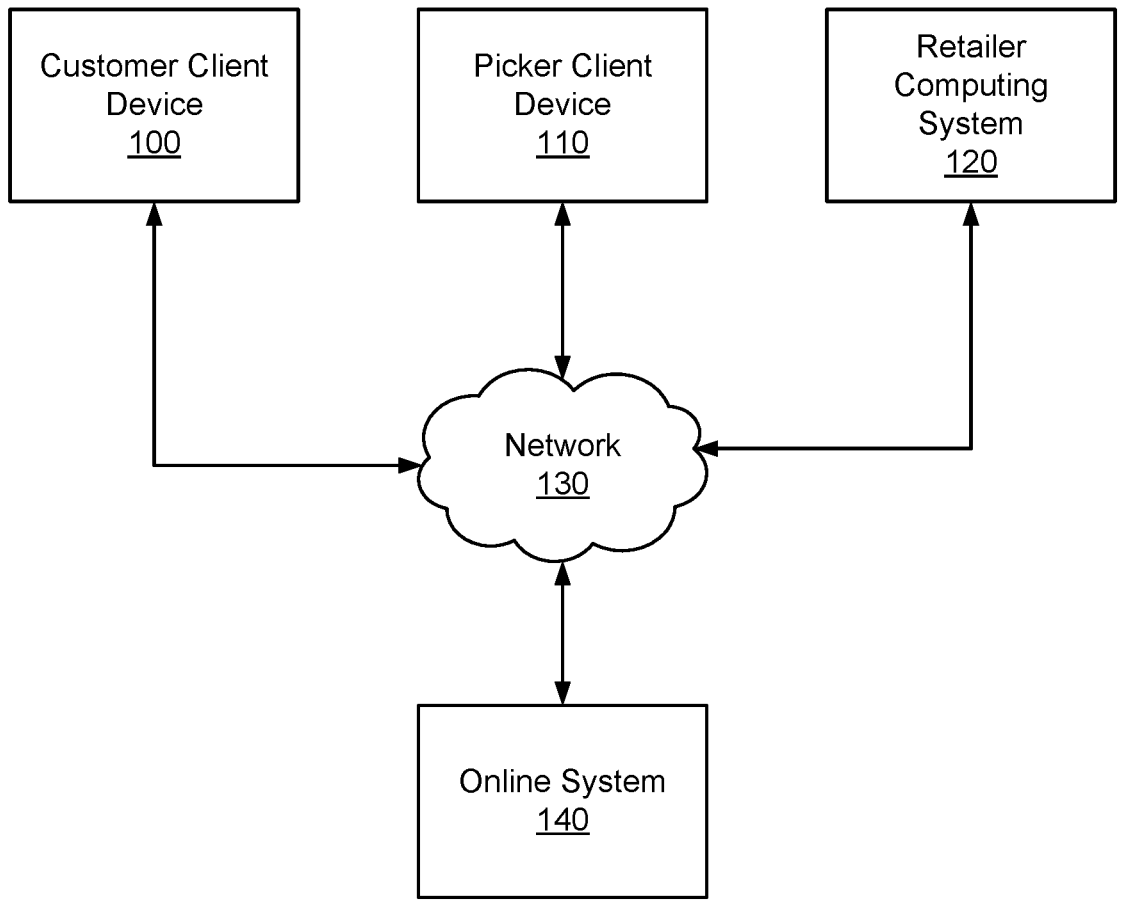
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a customer client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140.

Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item," as used herein, refers to a good or product that may be provided to the customer through the online system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the customer's order to the picker in a collection interface. The collection interface is a user interface that provides information to the picker identifying items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 provides instructions to a picker for delivering the items for a customer's order. For example, the picker client device 110 displays a delivery location from the order to the picker. The picker client device 110 also provides navigation instructions for the picker to travel from the retailer location to the delivery location. If a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 may provide item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a customer's order (e.g., as a commission).

The customer client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provide portions of the payment from the customer to the picker and the retailer. As an example, the online system 140 m
y allow a customer to order groceries from a grocery store retailer. The customer's order may specify which groceries they want delivered from the grocery store and the quantities of each of the groceries. The customer client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

Figure 2:
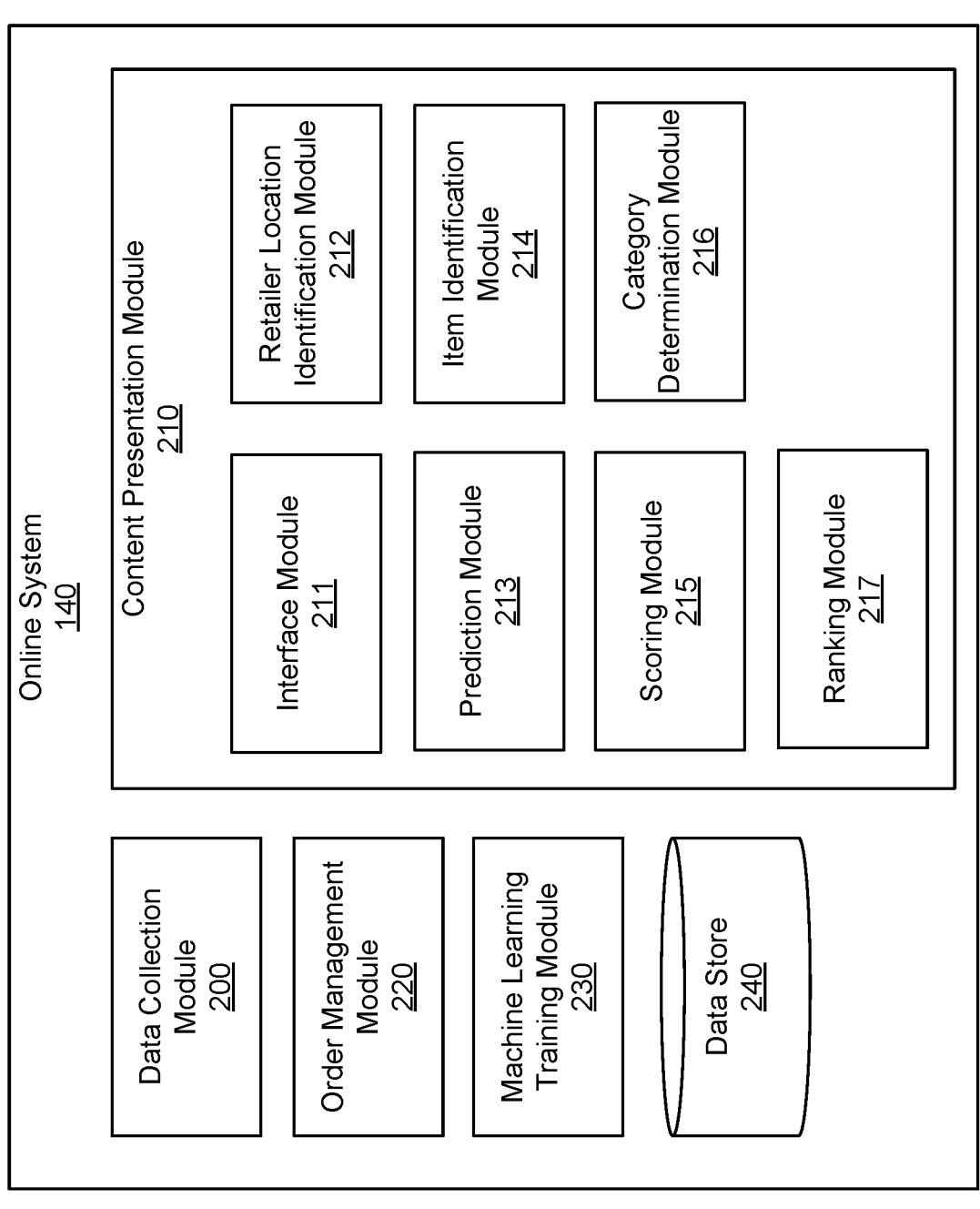
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects customer data, which is information or data that describe characteristics, attributes, or other types of information associated with a customer. Customer data may include user-identifying information (e.g., a username, an email address, or a phone number) associated with a customer, the customer's name, address, age, shopping preferences, favorite items, stored payment instruments, geographical location, and dietary preferences (e.g., vegetarian, gluten-free, etc.). Customer data also may include historical information (e.g., historical interaction information) associated with a customer, such as a search, browsing, or order history of the customer. Customer data further may include information describing retailers (e.g., names, types, geographical locations, etc.) or items (e.g., names, types, prices, etc.) with which a customer interacted (e.g., by searching for the items, clicking on them, adding them to a shopping list, etc.). Furthermore, customer data may include information associated with a customer that may be determined based on other customer data for the customer, such as a frequency with which the customer orders an item, an average number of items included in each order placed by the customer, or any other suitable types of information. Customer data also may include user satisfaction information describing a satisfaction of a customer with an item as a replacement for another item, as described below. The customer data also may include default settings established by a customer, such as a default retailer/retailer location, payment instrument, delivery location, or delivery timeframe. The data collection module 200 may collect the customer data from sensors on the customer client device 100 or based on a customer's interactions with the online system 140.

Various types of user satisfaction information may be included in the customer data collected by the data collection module 200. In some embodiments, user satisfaction information may describe an item selected by a customer as a satisfactory replacement for another item. For example, if an item in a customer's order was not available at a retailer location and a list of similar items was provided to the customer, the customer data may include information identifying an item selected by the customer as a satisfactory replacement. In various embodiments, user satisfaction information may describe a rating for an item selected as a replacement for another item. For example, if an item in a customer's order was not available at a retailer location and the item was replaced with a similar item, the customer data may include a rating provided by the customer describing their satisfaction with the replacement (e.g., "very satisfied," "satisfied," "neither satisfied nor dissatisfied," "dissatisfied," "very dissatisfied," etc.). In the above example, the customer data also may include a reason for the rating provided by the customer (e.g., the replacement was much more expensive than the item that was replaced, the replacement was not similar enough to the item that was replaced, etc.).

The data collection module 200 also collects item data, which is information or data that identifies and describes items that are available at a retailer location. The item data may include item identifiers for items that are available and may include quantities of items associated with each item identifier. Additionally, item data may also include attributes of items such as the sizes, colors, weights, stock keeping units (SKUs), serial numbers, prices, item categories, brands, sales, discounts, qualities (e.g., freshness, ripeness, etc.), ingredients, materials, manufacturing locations, or any other suitable attributes. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), a time that the item was last delivered to the retailer location, a quantity of the item that was last delivered to the retailer location, the rate at which the item is found, or the popularity of the item. The data collection module 200 may collect item data from a retailer computing system 120, a picker client device 110, or a customer client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. In some embodiments, item categories may be broader in that the same item category may include item types that are related to a common theme, found in the same department, etc. Furthermore, in various embodiments, an item may be included in multiple categories. For example, limeade may be included in a "limeade" item category, a "citrus juice" item category, and a "fruit juice" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a customer rating for the picker, the retailers from which the picker has collected items, or the picker's previous shopping history. Additionally, the picker data may include preferences expressed by the picker, such as their preferred retailers for collecting items, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. Components of the content presentation module 210 include: an interface module 211, a retailer location identification module 212, a prediction module 213, an item identification module 214, a scoring module 215, a category determination module 216, and a ranking module 217, which are further described below.

The interface module 211 generates and transmits an ordering interface for a customer to order items. The interface module 211 populates an ordering interface with items that a customer may select for adding to their order. In some embodiments, an ordering interface is generated by the interface module 211 based on a catalog of all items that are available to a customer, which the customer may browse to select items to order. The interface module 211 may generate an ordering interface in response to receiving a request from a customer client device 100 to access the ordering interface. In various embodiments, an ordering interface may be associated with a retailer. For example, an ordering interface may present items included among an inventory of a retailer that are available for a customer to order.

In some embodiments, the interface module 211 generates an ordering interface once various steps are performed by other components of the content presentation module 210. For example, the item identification module 214 may identify items that a customer is most likely to order and the interface module 211 may generate an ordering interface presenting those items to the customer. As an additional example, the scoring module 215 may score items and the ranking module 217 may rank the items based on their scores. In this example, an ordering interface generated by the interface module 211 may then display items with scores or rankings that exceed some threshold (e.g., the top n items or the p percentile of items). As yet another example, the prediction module 213 may predict availabilities of items and the interface module 211 may filter out items from presentation to a customer based on whether their predicted availabilities exceed a threshold.

The interface module 211 also may generate an ordering interface based at least in part on a ranked set of item categories associated with a set of "anchor items" and a ranked set of "candidate items" associated with each item category, as further described below. The ranked set of item categories and the ranked set of candidate items may be arranged within the ordering interface along different axes so that they are perpendicular to each other. For example, a ranked set of item categories may be arranged vertically in an ordering interface while a ranked set of candidate items associated with each item category may be arranged horizontally in the ordering interface, or vice versa. In some embodiments, a ranked set of item categories and a ranked set of candidate items may be arranged in presentation units (e.g., scrollable units, carousels, etc.) within an ordering interface. For example, a ranked set of item categories may be arranged within a vertically scrollable unit within an ordering interface while a ranked set of candidate items associated with each item category may be arranged within a horizontally scrollable unit within the ordering interface, or vice versa. Furthermore, a position within an ordering interface occupied by an item category or a candidate item may be based on a rank associated with the item category/candidate item. In the above example, a position of a scrollable unit or within a scrollable unit occupied by each item category or candidate item may be based on a rank associated with the item category/candidate item, such that item categories/candidate items associated with higher ranks occupy more prominent positions within the ordering interface than item categories/candidate items associated with lower ranks.

In embodiments in which a ranked set of item categories and a ranked set of candidate items are arranged along different axes within an ordering interface, the ranked set of item categories and the ranked set of candidate items may overlap. In such embodiments, each anchor item associated with an item category may occupy the most prominent position in the ordering interface associated with the item category. For example, suppose that each candidate item associated with an item category occupies a position of a horizontally scrollable unit within an ordering interface, in which a prominence of the position is based on a rank associated with each candidate item, and positions further to the left are more prominent within the ordering interface than positions further to the right. In this example, an anchor item associated with the item category may occupy a left-most position within the horizontally scrollable unit, a candidate item with the highest rank occupies the second-leftmost position, a candidate item with the second-highest rank occupies the third-leftmost position, etc. In embodiments in which item categories are ranked based on combined scores associated with anchor items, as described below, anchor items associated with an item category may occupy the most prominent positions in the ordering interface associated with the item category (e.g., based on a score associated with each anchor item computed by the scoring module 215, as described below). In the above example, if two anchor items are associated with the same item category, the anchor item associated with the higher score may occupy the leftmost position, the anchor item associated with the lower score may occupy the second-leftmost position, a candidate item with the highest rank may occupy the third-leftmost position, etc.

The retailer location identification module 212 identifies one or more retailer locations associated with a retailer based at least in part on a geographical location associated with a customer. The retailer location identification module 212 may identify the retailer location(s) in response to receiving a request from the customer to access an ordering interface associated with the retailer. For example, suppose that a request is received from a customer client device 100 associated with a customer to access an ordering interface associated with a retailer. In this example, the retailer location identification module 212 may access information describing a geographical location associated with the customer from the data store 240 corresponding to the customer's address or a default delivery location for orders placed by the customer. Continuing with this example, based on the geographical location associated with the customer and information identifying the retailer included in the request, the retailer location identification module 212 may identify one or more retailer locations operated by the retailer within a threshold distance of the geographical location or in the same geographical region as the geographical location.

The prediction module 213 predicts availabilities of items at retailer locations. The prediction module 213 may predict an availability of an item at a retailer location based at least in part on information received from a retailer computing system 120 or item data stored in the data store 240. For example, based on information describing a time that an item was last found at a retailer location, a time that the item was last not found at the retailer location, a time that the item was last delivered to the retailer location, etc., the prediction module 213 may predict an availability of the item at the retailer location.

In some embodiments, the prediction module 213 may use an availability model to predict an availability of an item at a retailer location. An availability model is a machine learning model that is trained to predict the availability of an item at a retailer location. For example, the availability model may be trained to predict a likelihood that an item is available at a retailer location or to predict a quantity of an item that is available at a retailer location. In various embodiments, the availability model may be trained by the machine learning training module 230 based at least in part on historical information describing availabilities of items at a retailer location, as described below. In embodiments in which the prediction module 213 uses the availability model to predict an availability of an item at a retailer location, the prediction module 213 may do so by accessing the model and applying it to a set of attributes associated with the item. For example, the prediction module 213 may apply the availability model to attributes associated with an item, such as a size, one or more colors, a weight, a SKU, etc. associated with the item. In this example, the availability model also may be applied to additional attributes associated with the item, such as a time that the item was last found at a retailer location, a time that the item was last not found at the retailer location, a time that the item was last delivered to the retailer location, etc. The prediction module 213 may then receive an output from the availability model corresponding to the predicted availability of the item at the retailer location. In the above example, the prediction module 213 may receive an output from the model corresponding to a percentage that is proportional to the likelihood that the item is available at the retailer location or a number corresponding to a quantity of the item predicted to be available at the retailer location.

The prediction module 213 also may predict a probability that a customer will interact with an item. Examples of types of interactions include: clicking on an item, adding an item to a shopping list, ordering an item, or any other suitable types of interactions. The prediction module 213 may make the prediction based at least in part on historical interaction information for the customer stored in the data store 240. For example, the prediction module 213 may predict a probability that a customer will interact with an item based on information describing previous interactions by the customer with the item, such as a number, a frequency, or a recency of the interactions, types of the interactions (e.g., clicking on the item, adding the item to a shopping list, or ordering the item), etc. In this example, the prediction module 213 also may predict the probability based on information describing previous interactions by the customer with items having at least a threshold measure of similarity to the item (e.g., items of the same type or brand, items that belong to the same item category, items in the same price range, etc.). In some embodiments, the prediction module 213 also may predict a probability that a customer will interact with an item based on information describing a current shopping session of the customer (e.g., based on information describing items in the customer's shopping list). For example, suppose that a customer usually orders one gallon of an item once a week and the customer ordered one gallon of the item about a week ago. In this example, the prediction module 213 may predict a high likelihood that the customer will interact with the item if one gallon of the item is not in the shopping list. Alternatively, in this example, the prediction module 213 may predict a low likelihood that the customer will interact with the item if one gallon of the item is in the shopping list.

In some embodiments, the prediction module 213 may use an interaction model to predict a probability that a customer will interact with an item. An interaction model is a machine learning model that is trained to predict a probability that a customer will interact with an item. For example, the interaction model may be trained to predict a probability that a customer will click on an item (e.g., as a predicted click-through rate). In various embodiments, the interaction model may be trained by the machine learning training module 230 based at least in part on historical interaction information for a customer with one or more items, as described below. In embodiments in which the prediction module 213 uses the interaction model to predict a probability that a customer will interact with an item, the prediction module 213 may do so by accessing the model and applying it to a set of attributes associated with the customer and an additional set of attributes associated with the item. For example, the prediction module 213 may apply the interaction model to attributes associated with a customer describing shopping and dietary preferences associated with the customer, the customer's favorite items, items in the customer's shopping list, etc. In this example, the interaction model also may be applied to attributes associated with an item describing a size, one or more colors, a weight, a SKU, etc. associated with the item. The prediction module 213 may then receive an output from the interaction model corresponding to the predicted probability that the customer will interact with the item. In the above example, the prediction module 213 may receive an output from the model corresponding to a percentage or a rate (e.g., a click-through rate) that is proportional to the predicted probability that the customer will interact with the item.

The prediction module 213 also may predict a likelihood that a customer will order an item again. The prediction module 213 may make the prediction based at least in part on historical order information associated with the customer. Examples of such types of historical order information include: a frequency with which the customer orders an item, a quantity of the item ordered by the customer, a most recent date that the customer ordered the item, etc. For example, if a customer usually orders a dozen units of an item once a week and the customer ordered a dozen units of the item about a week ago, the prediction module 213 may predict a high likelihood that the customer will order the item again. Alternatively, in the above example, if the customer ordered a dozen of the item two days ago, the prediction module 213 may predict a low likelihood that the customer will order the item again.

In some embodiments, the prediction module 213 may use a re-ordering model to predict a likelihood that a customer will order an item again. A re-ordering model is a machine learning model that is trained to predict a likelihood that a customer will order an item again. In various embodiments, the re-ordering model may be trained by the machine learning training module 230 based at least in part on historical order information associated with a customer, as described below. In embodiments in which the prediction module 213 uses the re-ordering model to predict a likelihood that a customer will order an item again, the prediction module 213 may do so by accessing the model and applying it to a set of attributes associated with the customer and an additional set of attributes associated with the item. For example, the prediction module 213 may apply the re-ordering model to attributes associated with a customer describing shopping and dietary preferences associated with the customer, the customer's favorite items, a time of the customer's most recent order including an item, a quantity of the item included in this order, etc. Continuing with this example, the re-ordering model also may be applied to attributes associated with the item describing a size, one or more colors, a weight, a SKU, etc. associated with the item. The prediction module 213 may then receive an output from the re-ordering model corresponding to the predicted likelihood that the customer will order the item again. In the above example, the prediction module 213 may receive an output from the model corresponding to a percentage that is proportional to the predicted likelihood that the customer will order the item again.

The prediction module 213 also may predict a likelihood of satisfaction of a customer with an item as a replacement for another item. The prediction module 213 may predict the likelihood based at least in part on historical user satisfaction information associated with one or more customers stored in the data store 240. For example, suppose that historical user satisfaction information describes the satisfaction of 50 customers with a first strawberry yogurt as a replacement for a second strawberry yogurt, in which the first and second strawberry yogurts are different brands, such that out of the 50 customers, 40 were satisfied with the replacement and 10 were dissatisfied. In this example, the prediction module 213 may predict a likelihood of satisfaction of a customer with the first strawberry yogurt as a replacement for the second strawberry yogurt to be 80% (i.e., 40/50).

In some embodiments, the prediction module 213 may use a satisfaction model to predict a likelihood of satisfaction of a customer with an item as a replacement for another item. A satisfaction model is a machine learning model that is trained to predict a likelihood of satisfaction of a customer with an item as a replacement for another item. For example, the satisfaction model may be trained to predict a likelihood of satisfaction of a customer with a first item if a second item was included in the customer's order and the first item was collected as a replacement for the second item because the second item was not available at a retailer location. In various embodiments, the satisfaction model may be trained by the machine learning training module 230 based at least in part on historical user satisfaction information associated with one or more customers, as described below. In embodiments in which the prediction module 213 uses the satisfaction model to predict a likelihood of satisfaction of a customer with a first item as a replacement for a second item, the prediction module 213 may do so by accessing the model and applying it to a first set of attributes associated with the customer, a second set of attributes associated with the first item, and a third set of attributes associated with the second item. For example, the prediction module 213 may apply the satisfaction model to a set of attributes associated with a customer describing shopping and dietary preferences associated with the customer, the customer's favorite items, etc. In this example, the prediction module 213 also may apply the satisfaction model to a set of attributes associated with a first item describing a size, a color, a weight, a SKU, etc. associated with the first item, and a similar set of attributes associated with a second item. The prediction module 213 may then receive an output from the satisfaction model corresponding to the predicted likelihood of satisfaction of the customer with the first item as a replacement for the second item. In the above example, the prediction module 213 may receive an output from the model corresponding to a percentage that is proportional to the predicted likelihood of satisfaction of the customer with the first item as a replacement for the second item.

The item identification module 214 identifies a set of items included in one or more previous orders associated with a customer and a retailer. The item identification module 214 may do so by accessing order data stored in the data store 240 and identifying one or more previous orders associated with both the customer and the retailer. The item identification module 214 may then identify a set of items included in the previous order(s). For example, the item identification module 214 may identify one or more previous orders placed by a customer that included items collected from one or more retailer locations operated by a retailer. In this example, the item identification module 214 then identifies a set of items that includes each item included in the previous order(s).

Once the item identification module 214 identifies a set of items included in one or more previous orders associated with a customer and a retailer, the item identification module 214 identifies a set of anchor items from the set of items, in which each anchor item is associated with at least a threshold predicted availability at one or more retailer locations. For example, suppose that 20 items included in previous orders associated with a customer and a retailer range in predicted availabilities from 15% to 97% at a retailer location operated by the retailer. In this example, if 15 of these items are associated with at least a threshold predicted availability of 75% at the retailer location, the 15 items are identified by the item identification module 214 as anchor items.

The item identification module 214 also identifies a set of candidate items, in which each candidate item is associated with an item category and at least a threshold predicted availability at one or more retailer locations. For example, for an item category such as "corn flake cereal," the item identification module 214 may identify a set of candidate items associated with the item category corresponding to seven different brands of corn flake cereals that range in predicted availabilities from 34% to 94% at a retailer location. In this example, if six of these items are associated with at least a threshold predicted availability of 85% at the retailer location, the six items are identified by the item identification module 214 as candidate items.

The scoring module 215 computes scores for anchor items identified by the item identification module 214. The scoring module 215 may compute a score for an anchor item based on an expected value associated with the anchor item. An expected value associated with an anchor item may be computed based on a value associated with the anchor item and a probability that a customer will interact with the anchor item. For example, suppose that an anchor item is sponsored by a brand associated with the anchor item. In this example, an expected value associated with the anchor item may be computed as a product of a bid amount associated with the anchor item (e.g., a cost-per-click bid) and a probability that a customer will interact with the anchor item (e.g., a predicted click-through rate). Continuing with this example, the scoring module 215 may then compute a score for the anchor item based on the expected value associated with the anchor item, such that the score is proportional to the expected value. In embodiments in which the scoring module 215 computes a score for an anchor item based on an expected value associated with the anchor item, the anchor item may be competing with other anchor items in an auction (e.g., a generalized second-price auction, in which a sponsor for the anchor item pays an amount based on a bid amount of a runner-up in the auction).

The scoring module 215 also or alternatively may compute a score for an anchor item based on a predicted likelihood associated with a customer. In some embodiments, a score for an anchor item may be computed based on a predicted likelihood that a customer will order the anchor item again. In the above example, the scoring module 215 also may compute the score for the anchor item based on a predicted likelihood that the customer will order the anchor item again, such that the score is proportional to a product of the expected value associated with the anchor item and the predicted likelihood. Alternatively, in the above example, if the anchor item is not sponsored, the scoring module 215 may compute the score for the anchor item based on the predicted likelihood and not on the expected value associated with the anchor item, such that the score is proportional to the predicted likelihood. In various embodiments, a score for an anchor item also may be computed based on a predicted likelihood that a customer will interact with the anchor item. In the above example, the scoring module 215 also may compute the score for the anchor item based on the predicted likelihood that the customer will interact with the anchor item (e.g., by adding it to a shopping list associated with the customer, by clicking on it, etc.). In this example, the score may be proportional to a product of the expected value associated with the anchor item and the predicted likelihood (if the anchor item is sponsored) or to the predicted likelihood alone (if the anchor item is not sponsored).

The scoring module 215 also computes scores for candidate items associated with an item category. The scoring module 215 may compute a score for a candidate item based on an expected value associated with the candidate item in a manner analogous to that described above for an anchor item. For example, suppose that a candidate item is sponsored by a brand associated with the candidate item. In this example, an expected value associated with the candidate item may be computed as a product of a bid amount associated with the candidate item (e.g., a cost-per-click bid) and a probability that a customer will interact with the candidate item (e.g., a predicted click-through rate). Continuing with this example, the scoring module 215 may then compute a score for the candidate item based on the expected value associated with the candidate item, such that the score is proportional to the expected value. In embodiments in which the scoring module 215 computes a score for a candidate item based on an expected value associated with the candidate item, the candidate item may be competing with other candidate items in an auction (e.g., a generalized second-price auction, in which a sponsor for the candidate item pays an amount based on a bid amount of a runner-up in the auction).

The scoring module 215 also or alternatively may compute a score for a candidate item based on a likelihood of satisfaction of a customer with the candidate item as a replacement for an anchor item predicted by the prediction module 213, in which the candidate item and the anchor item are associated with the same item category. In the above example, the scoring module 215 also may compute the score for the candidate item based on a predicted likelihood of satisfaction of the customer with the candidate item as a replacement for an anchor item, such that the score is proportional to a product of the expected value associated with the candidate item and the predicted likelihood. Alternatively, in the above example, if the candidate item is not sponsored, the scoring module 215 may compute the score for the candidate item based on the predicted likelihood and not on the expected value associated with the candidate item, such that the score is proportional to the predicted likelihood.

The scoring module 215 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the scoring module 215 scores items based on a search query received from the customer client device 100. A search query is text for a word or set of words that indicate items of interest to the customer. The scoring module 215 scores items based on a relatedness of the items to the search query. For example, the scoring module 215 may apply natural language processing (NLP) techniques to the text in the search query to generate a search query representation (e.g., an embedding) that represents characteristics of the search query. The scoring module 215 may use the search query representation to score candidate items for presentation to a customer (e.g., by comparing a search query embedding to an item embedding). In some embodiments, the scoring module 215 scores items based on a predicted availability of an item. For example, if the prediction module 213 predicts availabilities of items, the scoring module 215 may then weight the scores for the items based on their predicted availabilities.

The category determination module 216 determines item categories associated with anchor items. The category determination module 216 may determine an item category associated with an anchor item based on item data associated with the anchor item stored in the data store 240. For example, if an anchor item is a particular brand, type, and size of ground coffee, the category determination module 216 may determine an item category associated with the anchor item corresponding to "ground coffee." In some embodiments, the category determination module 216 may determine an item category associated with an anchor item based on a diversity of the item category. For example, if an anchor item is a specific brand and size of limeade, the category determination module 216 may access item data for the anchor item and identify a "limeade" item category, a "citrus juice" item category, and a "fruit juice" item category associated with the anchor item. In this example, suppose that the "limeade" item category is associated with only two items, the "citrus juice" item category is associated with 32 items, and the "fruit juice" item category is associated with 278 items. Continuing with this example, the category determination module 216 may determine that the anchor item is associated with a most narrow item category that is associated with at least a threshold number of items (e.g., the "citrus juice" item category if the threshold number is 20).

The ranking module 217 ranks item categories associated with anchor items. The ranking module 217 may do so based at least in part on a score computed for each anchor item. For example, the ranking module 217 may rank a set of item categories associated with a set of anchor items based on a score computed for each anchor item, in which an item category associated with an anchor item with a highest score is ranked the highest, followed by an item category associated with an anchor item with a second-highest score, etc. In some embodiments, the ranking module 217 may rank item categories based on combined scores associated with anchor items. In such embodiments, the ranking module 217 may identify anchor items associated with the same item category, combine the scores associated with the anchor items, and use the combined score to rank the item category among other item categories. For example, if two or more anchor items corresponding to different types of sliced white bread are associated with a "sliced white bread" item category, the ranking module 217 may compute a sum of the scores associated with the anchor items and use the sum to rank the "sliced white bread" item category among other item categories associated with other anchor items.

The ranking module 217 also ranks a set of candidate items associated with an item category. The ranking module 217 may do so based at least in part on a score computed for each candidate item associated with the item category. For example, the ranking module 217 may rank a set of candidate items associated with an item category based on a score computed for each candidate item, in which a candidate item with a highest score is ranked the highest, followed by a candidate item with a second-highest score, etc.

The order management module 220 manages orders for items from customers. The order management module 220 receives orders from customer client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by customers, or how often a picker agrees to service an order.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit instructions to the picker client device 110 to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online system 140. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model is used by the machine learning model to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

In embodiments in which the prediction module 213 accesses an availability model that is trained to predict an availability of an item at a retailer location, the machine learning training module 230 may train the availability model. In some embodiments, the machine learning training module 230 may train the availability model to predict a likelihood that an item is available at a retailer location, while in other embodiments, the machine learning training module 230 may train the availability model to predict a quantity of an item that is available at a retailer location. The machine learning training module 230 may train the availability model via supervised learning based at least in part on attributes of items included among an inventory of a retailer that operates a retailer location and historical information describing availabilities of the items at the retailer location.

To illustrate an example of how the availability model may be trained, suppose that the machine learning training module 230 receives a set of training examples including attributes of items included among an inventory of a retailer that operates a retailer location, such as their sizes, colors, weights, SKUs, serial numbers, prices, item categories, brands, sales, discounts, qualities, ingredients, materials, manufacturing locations, etc. In this example, attributes of the items also may include times that the items were found at the retailer location, times that the items were not found at the retailer location, times that the items were delivered to the retailer location, quantities of the items that were delivered to the retailer location, rates at which the items were found at the retailer location, the popularity of the items at the retailer location, etc. In the above example, the machine learning training module 230 also may receive labels which represent expected outputs of the availability model, in which a label indicates whether an item was available at the retailer location. Alternatively, in the above example, a label may indicate a quantity of an item that was available at the retailer location. Continuing with this example, the machine learning training module 230 may then train the availability model based on the attributes of the items as well as the labels by comparing its output from input data of each training example to the label for the training example.

In embodiments in which the prediction module 213 accesses an interaction model that is trained to predict a probability that a customer will interact with an item, the machine learning training module 230 may train the interaction model. The machine learning training module 230 may train the interaction model via supervised learning based at least in part on attributes of items presented to customers, attributes of the customers, and historical interaction information for the customers with items. In some embodiments, the interaction model uses item embeddings describing items and customer embeddings describing customers to predict a probability that a customer will interact with an item. These item embeddings and customer embeddings may be generated by separate machine learning models and may be stored in the data store 240.

To illustrate an example of how the interaction model may be trained, suppose that the machine learning training module 230 receives a set of training examples. In this example, the set of training examples may include attributes of items presented to customers (e.g., sizes, colors, weights, SKUs, serial numbers, prices, item categories, brands, sales, discounts, qualities, ingredients, materials, manufacturing locations, etc. associated with the items). In this example, the set of training examples also may include attributes of customers to whom the items were presented (e.g., names, geographical locations, favorite items, dietary preferences, historical order and interaction information, etc. associated with the customers). In the above example, the machine learning training module 230 also may receive labels which represent expected outputs of the interaction model, in which a label indicates whether a customer interacted with an item (e.g., by clicking on it). Continuing with this example, the machine learning training module 230 may then train the interaction model based on the attributes of the items and customers, as well as the labels by comparing its output from input data of each training example to the label for the training example.

In embodiments in which the prediction module 213 accesses a re-ordering model that is trained to predict a likelihood that a customer will order an item again, the machine learning training module 230 may train the re-ordering model. The machine learning training module 230 may train the re-ordering model via supervised learning based at least in part on attributes of items and customers, as well as historical order information associated with customers. In some embodiments, the re-ordering model uses item embeddings describing items and customer embeddings describing customers to predict a likelihood that a customer will order an item again. These item embeddings and customer embeddings may be generated by separate machine learning models and may be stored in the data store 240.

To illustrate an example of how the re-ordering model may be trained, suppose that the machine learning training module 230 receives a set of training examples. In this example, the set of training examples may include attributes of items (e.g., sizes, colors, weights, SKUs, serial numbers, prices, item categories, brands, sales, discounts, qualities, ingredients, materials, manufacturing locations, etc. associated with the items). In this example, the set of training examples also may include attributes of customers (e.g., names, geographical locations, favorite items, dietary preferences, historical order and interaction information, information identifying items in shopping lists, etc. associated with the customers). In the above example, the machine learning training module 230 also may receive labels which represent expected outputs of the re-ordering model, in which a label indicates whether a customer ordered an item again. Continuing with this example, the machine learning training module 230 may then train the re-ordering model based on the attributes of the items and customers, as well as the labels by comparing its output from input data of each training example to the label for the training example.

In embodiments in which the prediction module 213 accesses a satisfaction model that is trained to predict a likelihood of satisfaction of a customer with an item as a replacement for another item, the machine learning training module 230 may train the satisfaction model. The machine learning training module 230 may train the satisfaction model via supervised learning based at least in part on attributes of items and customers and historical user satisfaction information associated with the customers. In some embodiments, the satisfaction model uses item embeddings describing items and customer embeddings describing customers to predict a likelihood of satisfaction of a customer with an item as a replacement for another item. These item embeddings and customer embeddings may be generated by separate machine learning models and may be stored in the data store 240.

To illustrate an example of how the satisfaction model may be trained, suppose that the machine learning training module 230 receives a set of training examples. In this example, the set of training examples may include attributes of items that were replaced and attributes of items that were replacements for those items (e.g., sizes, colors, weights, SKUs, serial numbers, prices, item categories, brands, sales, discounts, qualities, ingredients, materials, manufacturing locations, etc. associated with the items). In this example, the set of training examples also may include attributes of customers who received replacements for items in their orders (e.g., names, geographical locations, favorite items, dietary preferences, historical order and interaction information, etc. associated with the customers). In the above example, the machine learning training module 230 also may receive labels which represent expected outputs of the satisfaction model, in which a label indicates whether a customer was satisfied with an item replacement. Continuing with this example, the machine learning training module 230 may then train the satisfaction model based on the attributes of the items and customers, as well as the labels by comparing its output from input data of each training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In situations in which the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Generating an Ordering Interface Based on a Category-Based Ranking of Previously Ordered Items and an Item-Based Ranking of Replacement Items FIG. 3 is a flowchart of a method for generating an ordering interface based on a category-based ranking of previously ordered items and an item-based ranking of replacement items, in accordance with one or more embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system 140 without human intervention.

The online system 140 receives 305 (e.g., via the interface module 211) a request from a customer client device 100 associated with a customer to access an ordering interface associated with a retailer. For example, the online system 140 may receive 305 a request from the customer client device 100 to access the ordering interface, in which the ordering interface is associated with a grocery store retailer. The request received 305 from the customer client device 100 may include user-identifying information associated with the customer. In the above example, the request may be received 305 in association with a username or other user-identifying information associated with the customer.

The online system 140 then identifies 310 (e.g., using the retailer location identification module 212) one or more retailer locations associated with the retailer. The online system 140 may identify 310 the retailer location(s) based at least in part on a geographical location associated with the customer. For example, based on user-identifying information associated with the customer included with the request received 305 from the customer, the online system 140 may access information describing a geographical location associated with the customer (e.g., from the data store 240) corresponding to the customer's address or a default delivery location for orders placed by the customer. Continuing with this example, based on the geographical location associated with the customer and information identifying the retailer included in the request, the online system 140 may identify 310 one or more retailer locations operated by the retailer within a threshold distance of the geographical location or in the same geographical region as the geographical location.

The online system 140 then predicts (e.g., using the prediction module 213) an availability of each item included among an inventory of the retailer at the retailer location(s). The online system 140 may predict an availability of an item at a retailer location based at least in part on information received from a retailer computing system 120 or item data (e.g., stored in the data store 240). For example, based on information describing a time that an item was last found at a retailer location, a time that the item was last not found at the retailer location, a time that the item was last delivered to the retailer location, etc., the online system 140 may predict an availability of the item at the retailer location.

In some embodiments, the online system 140 may use an availability model to predict an availability of an item at a retailer location. An availability model is a machine learning model that is trained to predict the availability of an item at a retailer location. For example, the availability model may be trained to predict a likelihood that an item is available at a retailer location or to predict a quantity of an item that is available at a retailer location. In various embodiments, the availability model may be trained by the online system 140 (e.g., using the machine learning training module 230) based at least in part on historical information describing availabilities of items at a retailer location. In embodiments in which the online system 140 uses the availability model to predict an availability of an item at a retailer location, the online system 140 may do so by accessing the model and applying 315 it to a set of attributes associated with the item. For example, the online system 140 may apply 315 the availability model to attributes associated with an item, such as a size, one or more colors, a weight, a SKU, etc. associated with the item. In this example, the availability model also may be applied 315 to additional attributes associated with the item, such as a time that the item was last found at a retailer location, a time that the item was last not found at the retailer location, a time that the item was last delivered to the retailer location, etc. The online system 140 may then receive an output from the availability model corresponding to the predicted availability of the item at the retailer location. In the above example, the online system 140 may receive an output from the model corresponding to a percentage that is proportional to the likelihood that the item is available at the retailer location or a number corresponding to a quantity of the item predicted to be available at the retailer location.

The online system 140 identifies 320 (e.g., using the item identification module 214) a set of items included in one or more previous orders associated with the customer and the retailer. The online system 140 may do so by accessing order data (e.g., stored in the data store 240) and identifying one or more previous orders associated with both the customer and the retailer. The online system 140 may then identify 320 the set of items included in the previous order(s). For example, the online system 140 may identify one or more previous orders placed by the customer that included items collected from one or more retailer locations operated by the retailer. In this example, the online system 140 then identifies 320 the set of items that includes each item included in the previous order(s).

Once the online system 140 identifies 320 the set of items included in the previous order(s) associated with the customer and the retailer, the online system 140 identifies 325 (e.g., using the item identification module 214) a set of anchor items from the set of items, in which each anchor item is associated with at least a threshold predicted availability at the retailer location(s). For example, suppose that 20 items included in previous orders associated with the customer and the retailer range in predicted availabilities from 15% to 97% at the retailer location(s). In this example, if 15 of these items are associated with at least a threshold predicted availability of 75%, the 15 items are identified 325 by the online system 140 as anchor items.

The online system 140 may then predict (e.g., using the prediction module 213) a probability that the customer will interact with an anchor item. Examples of types of interactions include: clicking on an anchor item, adding an anchor item to a shopping list, ordering an anchor item, or any other suitable types of interactions. The online system 140 may make the prediction based at least in part on historical interaction information for the customer (e.g., stored in the data store 240). For example, the online system 140 may predict a probability that the customer will interact with an anchor item based on information describing previous interactions by the customer with the anchor item, such as a number, a frequency, or a recency of the interactions, types of the interactions (e.g., clicking on the anchor item, adding the anchor item to a shopping list, or ordering the anchor item), etc. In this example, the online system 140 also may predict the probability based on information describing previous interactions by the customer with items having at least a threshold measure of similarity to the anchor item (e.g., items of the same type or brand, items that belong to the same item category, items in the same price range, etc.). In some embodiments, the online system 140 also may predict the probability that the customer will interact with an anchor item based on information describing a current shopping session of the customer (e.g., based on information describing items in the customer's shopping list). For example, suppose that the customer usually orders one gallon of an item once a week and the customer ordered one gallon of the item about a week ago. In this example, the online system 140 may predict a high likelihood that the customer will interact with the item if one gallon of the item is not in the shopping list. Alternatively, in this example, the online system 140 may predict a low likelihood that the customer will interact with the item if one gallon of the item is in the shopping list.

In some embodiments, the online system 140 may use an interaction model to predict the probability that the customer will interact with an anchor item. An interaction model is a machine learning model that is trained to predict a probability that a customer will interact with an item. For example, the interaction model may be trained to predict a probability that the customer will click on an anchor item (e.g., as a predicted click-through rate). In various embodiments, the interaction model may be trained by the online system 140 (e.g., using the machine learning training module 230) based at least in part on historical interaction information for the customer with one or more items. In embodiments in which the online system 140 uses an interaction model to predict the probability that the customer will interact with an anchor item, the online system 140 may do so by accessing the model and applying it to a set of attributes associated with the customer and an additional set of attributes associated with the anchor item. For example, the online system 140 may apply the interaction model to attributes associated with the customer describing shopping and dietary preferences associated with the customer, the customer's favorite items, items in the customer's shopping list, etc. In this example, the interaction model also may be applied to attributes associated with an anchor item describing a size, one or more colors, a weight, a SKU, etc. associated with the anchor item. The online system 140 may then receive an output from the interaction model corresponding to the predicted probability that the customer will interact with the anchor item. In the above example, the online system 140 may receive an output from the model corresponding to a percentage or a rate (e.g., a click-through rate) that is proportional to the predicted probability that the customer will interact with the anchor item.

The online system 140 also may predict (e.g., using the prediction module 213) a likelihood that the customer will order an anchor item again. The online system 140 may make the prediction based at least in part on historical order information associated with the customer. Examples of such types of historical order information include: a frequency with which the customer orders an anchor item, a quantity of the anchor item ordered by the customer, a most recent date that the customer ordered the anchor item, etc. For example, if the customer usually orders a dozen units of an anchor item once a week and the customer ordered a dozen units of the item about a week ago, the online system 140 may predict a high likelihood that the customer will order the anchor item again. Alternatively, in the above example, if the customer ordered a dozen of the anchor item two days ago, the online system 140 may predict a low likelihood that the customer will order the anchor item again.

In some embodiments, the online system 140 may use a re-ordering model to predict the likelihood that the customer will order an anchor item again. A re-ordering model is a machine learning model that is trained to predict a likelihood that a customer will order an item again. In various embodiments, the re-ordering model may be trained by the online system 140 (e.g., using the machine learning training module 230) based at least in part on historical order information associated with the customer. In embodiments in which the online system 140 uses a re-ordering model to predict the likelihood that the customer will order an anchor item again, the online system 140 may do so by accessing the model and applying it to a set of attributes associated with the customer and an additional set of attributes associated with the anchor item. For example, the online system 140 may apply the re-ordering model to attributes associated with the customer describing shopping and dietary preferences associated with the customer, the customer's favorite items, a time of the customer's most recent order including an anchor item, a quantity of the anchor item included in this order, etc. Continuing with this example, the re-ordering model also may be applied to attributes associated with the anchor item describing a size, one or more colors, a weight, a SKU, etc. associated with the anchor item. The online system 140 may then receive an output from the re-ordering model corresponding to the predicted likelihood that the customer will order the anchor item again. In the above example, the online system 140 may receive an output from the model corresponding to a percentage that is proportional to the predicted likelihood that the customer will order the anchor item again.

The online system 140 then computes 330 (e.g., using the scoring module 215) a first score for each anchor item. The online system 140 may compute 330 a first score for an anchor item based on an expected value associated with the anchor item. An expected value associated with an anchor item may be computed based on a value associated with the anchor item and the probability that the customer will interact with the anchor item. For example, suppose that an anchor item is sponsored by a brand associated with the anchor item. In this example, an expected value associated with the anchor item may be computed as a product of a bid amount associated with the anchor item (e.g., a cost-per-click bid) and a probability that the customer will interact with the anchor item (e.g., a predicted click-through rate). Continuing with this example, the online system 140 may then compute 330 a first score for the anchor item based on the expected value associated with the anchor item, such that the score is proportional to the expected value. In embodiments in which the online system 140 computes 330 a first score for an anchor item based on an expected value associated with the anchor item, the anchor item may be competing with other anchor items in an auction (e.g., a generalized second-price auction, in which a sponsor for the anchor item pays an amount based on a bid amount of a runner-up in the auction).

The online system 140 also or alternatively may compute the first score for an anchor item based on a predicted likelihood associated with the customer. In some embodiments, the first score for an anchor item may be computed 330 based on the predicted likelihood that the customer will order the anchor item again. In the above example, the online system 140 also may compute 330 the first score for the anchor item based on the predicted likelihood that the customer will order the anchor item again, such that the first score is proportional to a product of the expected value associated with the anchor item and the predicted likelihood. Alternatively, in the above example, if the anchor item is not sponsored, the online system 140 may compute 330 the first score for the anchor item based on the predicted likelihood and not on the expected value associated with the anchor item, such that the first score is proportional to the predicted likelihood. In various embodiments, the first score for an anchor item also may be computed 330 based on the predicted likelihood that the customer will interact with the anchor item. In the above example, the online system 140 also may compute 330 the first score for the anchor item based on the predicted likelihood that the customer will interact with the anchor item (e.g., by adding it to a shopping list associated with the customer, by clicking on it, etc.). In this example, the first score may be proportional to a product of the expected value associated with the anchor item and the predicted likelihood (if the anchor item is sponsored) or to the predicted likelihood alone (if the anchor item is not sponsored).

The online system 140 determines 335 (e.g., using the category determination module 216) an item category associated with each anchor item. The online system 140 may determine 335 an item category associated with an anchor item based on item data associated with the anchor item (e.g., stored in the data store 240). For example, if an anchor item is a particular brand, type, and size of ground coffee, the online system 140 may determine 335 an item category associated with the anchor item corresponding to "ground coffee." In some embodiments, the online system 140 may determine 335 an item category associated with an anchor item based on a diversity of the item category. For example, if an anchor item is a specific brand and size of limeade, the online system 140 may access item data for the anchor item and identify a "limeade" item category, a "citrus juice" item category, and a "fruit juice" item category associated with the anchor item. In this example, suppose that the "limeade" item category is associated with only two items, the "citrus juice" item category is associated with 32 items, and the "fruit juice" item category is associated with 278 items. Continuing with this example, the online system 140 may determine 335 that the anchor item is associated with a most narrow item category that is associated with at least a threshold number of items (e.g., the "citrus juice" item category if the threshold number is 20).

Figure 4A:
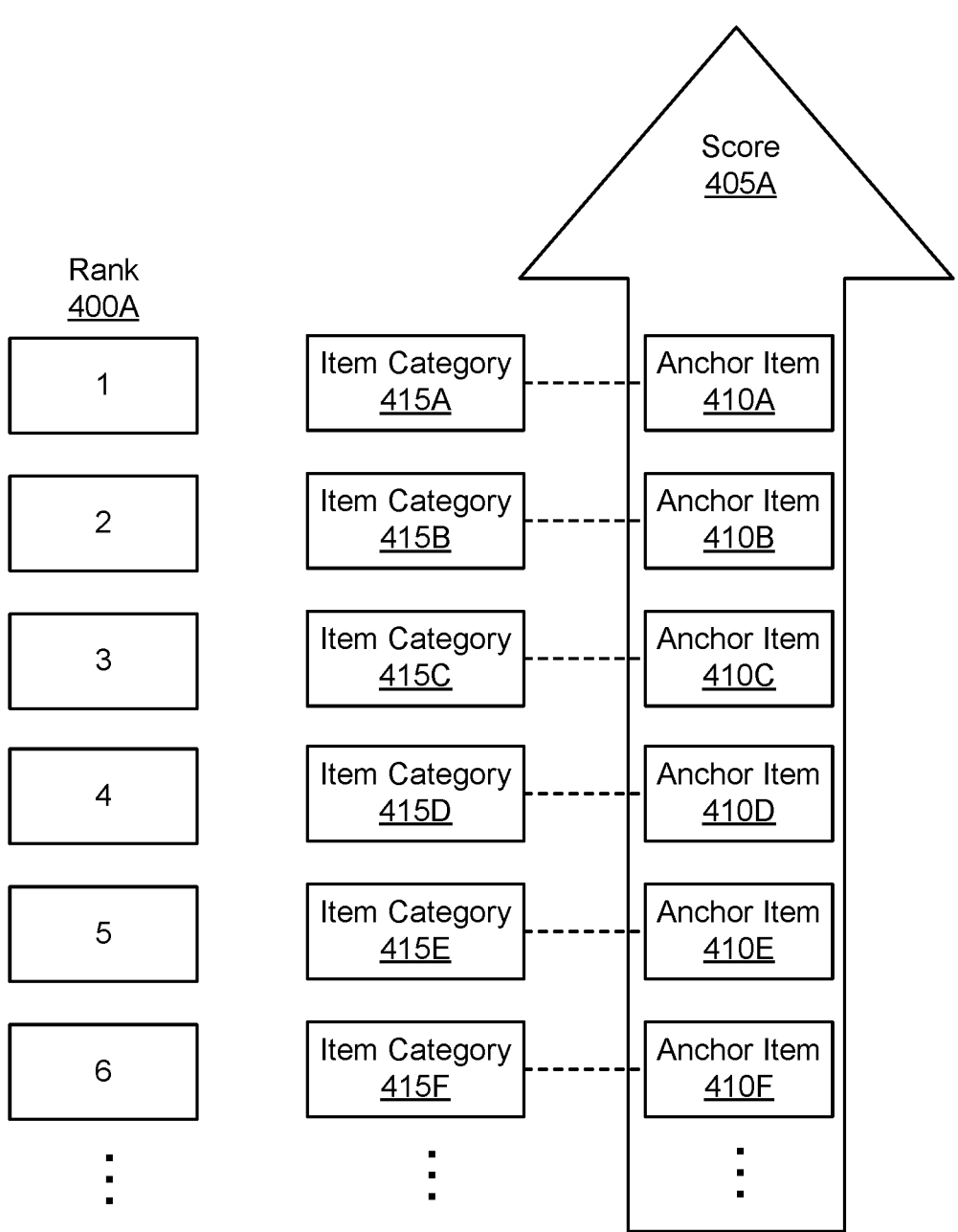
FIG. 4A illustrates an example of a category-based ranking of previously ordered items, in accordance with one or more embodiments.

The online system 140 then ranks 340 (e.g., using the ranking module 217) a set of item categories associated with the set of anchor items. The online system 140 may do so based at least in part on the first score computed 330 for each anchor item. For example, as shown in FIG. 4A, which illustrates an example of a category-based ranking of previously ordered items, in accordance with one or more embodiments, the online system 140 may rank 340 the set of item categories 415 associated with the set of anchor items 410 based on a first score 405A computed 330 for each anchor item 410. In this example, an item category 415A associated with an anchor item 410A with a highest first score 405A has the highest rank 400A, followed by an item category 415B associated with an anchor item 410B with a second-highest first score 405A, etc.

In some embodiments, the online system 140 may rank 340 the set of item categories 415 based on combined first scores 405A associated with anchor items 410. In such embodiments, the online system 140 may identify anchor items 410 associated with the same item category 415, combine the first scores 405A associated with the anchor items 410, and use the combined first score 405A to rank 340 the item category 415 among other item categories 415. For example, if two or more anchor items 410 corresponding to different types of sliced white bread are associated with a "sliced white bread" item category 415, the online system 140 may compute a sum of the first scores 405A associated with the anchor items 410 and use the sum to rank 340 the "sliced white bread" item category 415 among other item categories 415 associated with other anchor items 410.

Referring back to FIG. 3, for each item category 415 included among the set of item categories 415, the online system 140 identifies 345 (e.g., using the item identification module 214) a set of candidate items, in which each candidate item is associated with a corresponding item category 415 and at least a threshold predicted availability at the retailer location(s). For example, for an item category 415 such as "corn flake cereal," the online system 140 may identify 345 the set of candidate items associated with the item category 415 corresponding to seven different brands of corn flake cereals that range in predicted availabilities from 34% to 94% at the retailer location(s). In this example, if six of these items are associated with at least a threshold predicted availability of 85% at the retailer location(s), the six items are identified 345 by the online system 140 as candidate items.

For each item category 415 included among the set of item categories 415, the online system 140 also computes 350 (e.g., using the scoring module 215) a second score for each candidate item associated with the item category 415. The online system 140 may compute 350 a second score for a candidate item based on an expected value associated with the candidate item in a manner analogous to that described above for an anchor item 410. For example, suppose that a candidate item is sponsored by a brand associated with the candidate item. In this example, an expected value associated with the candidate item may be computed as a product of a bid amount associated with the candidate item (e.g., a cost-per-click bid) and a probability that the customer will interact with the candidate item (e.g., a predicted click-through rate). Continuing with this example, the online system 140 may then compute 350 a second score for the candidate item based on the expected value associated with the candidate item, such that the second score is proportional to the expected value. In embodiments in which the online system 140 computes 350 a second score for a candidate item based on an expected value associated with the candidate item, the candidate item may be competing with other candidate items in an auction (e.g., a generalized second-price auction, in which a sponsor for the candidate item pays an amount based on a bid amount of a runner-up in the auction).

The online system 140 also or alternatively may compute 350 a second score for a candidate item based on a likelihood of satisfaction of the customer with the candidate item as a replacement for an anchor item 410 predicted by the online system 140, as described below, in which the candidate item and the anchor item 410 are associated with the same item category 415. In the above example, the online system 140 also may compute 350 the second score for the candidate item based on the predicted likelihood of satisfaction of the customer with the candidate item as a replacement for an anchor item 410, such that the second score is proportional to a product of the expected value associated with the candidate item and the predicted likelihood. Alternatively, in the above example, if the candidate item is not sponsored, the online system 140 may compute 350 the second score for the candidate item based on the predicted likelihood and not on the expected value associated with the candidate item, such that the second score is proportional to the predicted likelihood.

The online system 140 may predict (e.g., using the prediction module 213) the likelihood of satisfaction of the customer with a candidate item as a replacement for an anchor item 410 based at least in part on historical user satisfaction information associated with one or more customers (e.g., stored in the data store 240). For example, suppose that historical user satisfaction information describes the satisfaction of 50 customers with a first strawberry yogurt as a replacement for a second strawberry yogurt, in which the first and second strawberry yogurts are different brands, such that out of the 50 customers, 40 were satisfied with the replacement and 10 were dissatisfied. In this example, the online system 140 may predict a likelihood of satisfaction of the customer with a candidate item corresponding to the first strawberry yogurt as a replacement for an anchor item 410 corresponding to the second strawberry yogurt to be 80% (i.e., 40/50).

In some embodiments, the online system 140 may use a satisfaction model to predict the likelihood of satisfaction of the customer with a candidate item as a replacement for an anchor item 410. A satisfaction model is a machine learning model that is trained to predict a likelihood of satisfaction of a customer with an item as a replacement for another item. For example, the satisfaction model may be trained to predict the likelihood of satisfaction of the customer with a candidate item if an anchor item 410 was included in the customer's order and the candidate item was collected as a replacement for the anchor item 410 because the anchor item 410 was not available at a retailer location. In various embodiments, the satisfaction model may be trained by the online system 140 (e.g., using the machine learning training module 230) based at least in part on historical user satisfaction information associated with one or more customers. In embodiments in which the online system 140 uses a satisfaction model to predict the likelihood of satisfaction of the customer with a candidate item as a replacement for an anchor item 410, the online system 140 may do so by accessing the model and applying it to a first set of attributes associated with the customer, a second set of attributes associated with the candidate item, and a third set of attributes associated with the anchor item 410. For example, the online system 140 may apply the satisfaction model to a set of attributes associated with the customer describing shopping and dietary preferences associated with the customer, the customer's favorite items, etc. In this example, the online system 140 also may apply the satisfaction model to a set of attributes associated with a candidate item describing a size, a color, a weight, a SKU, etc. associated with the candidate item, and a similar set of attributes associated with an anchor item 410. The online system 140 may then receive an output from the satisfaction model corresponding to the predicted likelihood of satisfaction of the customer with the candidate item as a replacement for the anchor item 410. In the above example, the online system 140 may receive an output from the model corresponding to a percentage that is proportional to the predicted likelihood of satisfaction of the customer with the candidate item as a replacement for the anchor item 410.

Figure 4B:
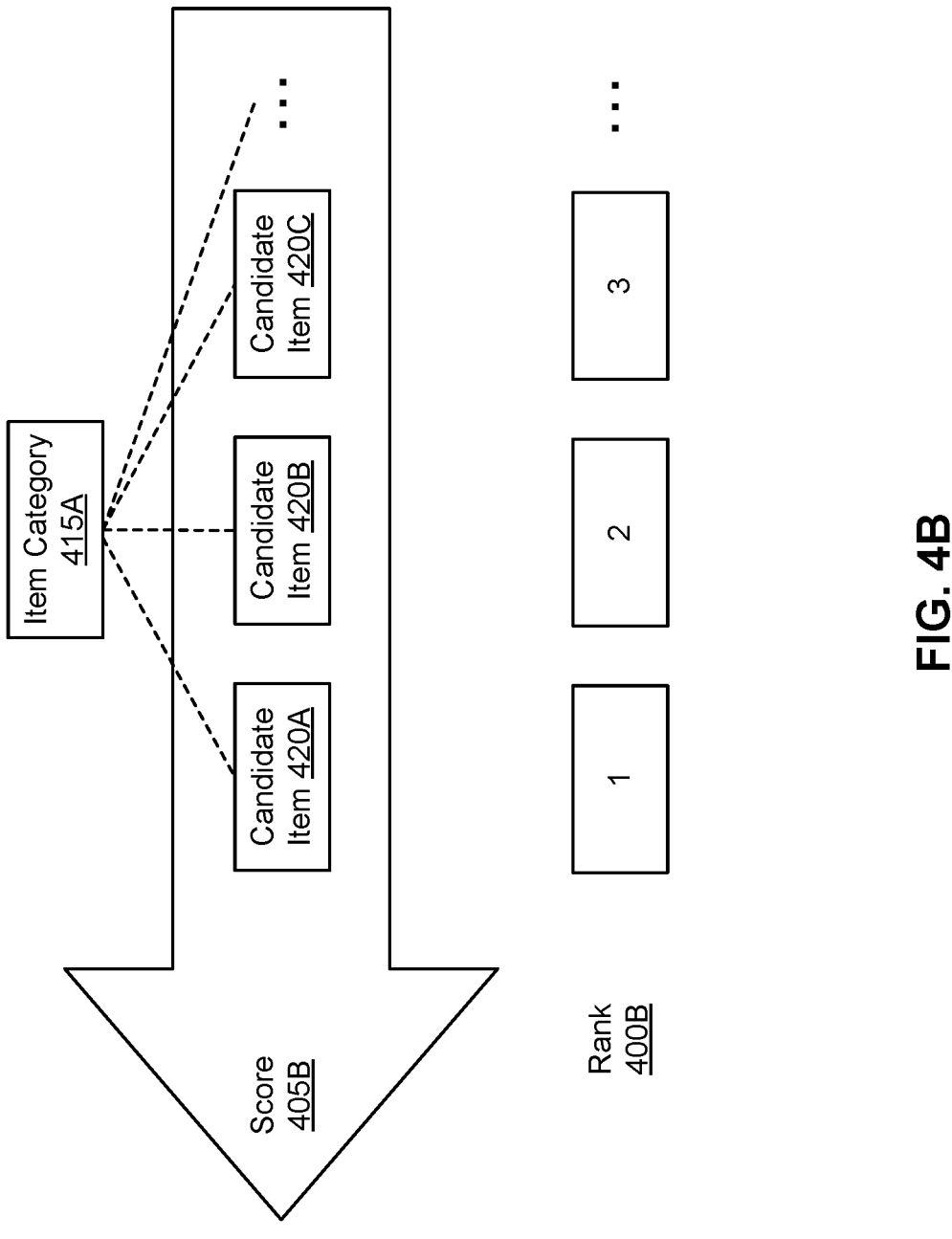
FIG. 4B illustrates an example of an item-based ranking of replacement items, in accordance with one or more embodiments.

For each category included among the set of categories, the online system 140 ranks 355 (e.g., using the ranking module 217) the set of candidate items associated with the item category 415. The online system 140 may do so based at least in part on the second score computed 350 for each candidate item associated with the item category 415. FIG. 4B illustrates an example of an item-based ranking of replacement items, in accordance with one or more embodiments, and continues the example described above in conjunction with FIG. 4A. As shown in FIG. 4B, the online system 140 may rank 355 a set of candidate items 420 associated with an item category 415A based on a second score 405B computed 350 for each candidate item 420, in which a candidate item 420A with a highest second score 405B is ranked 355 the highest, followed by a candidate item 420B with a second-highest second score 405B, etc.

Figure 4C:
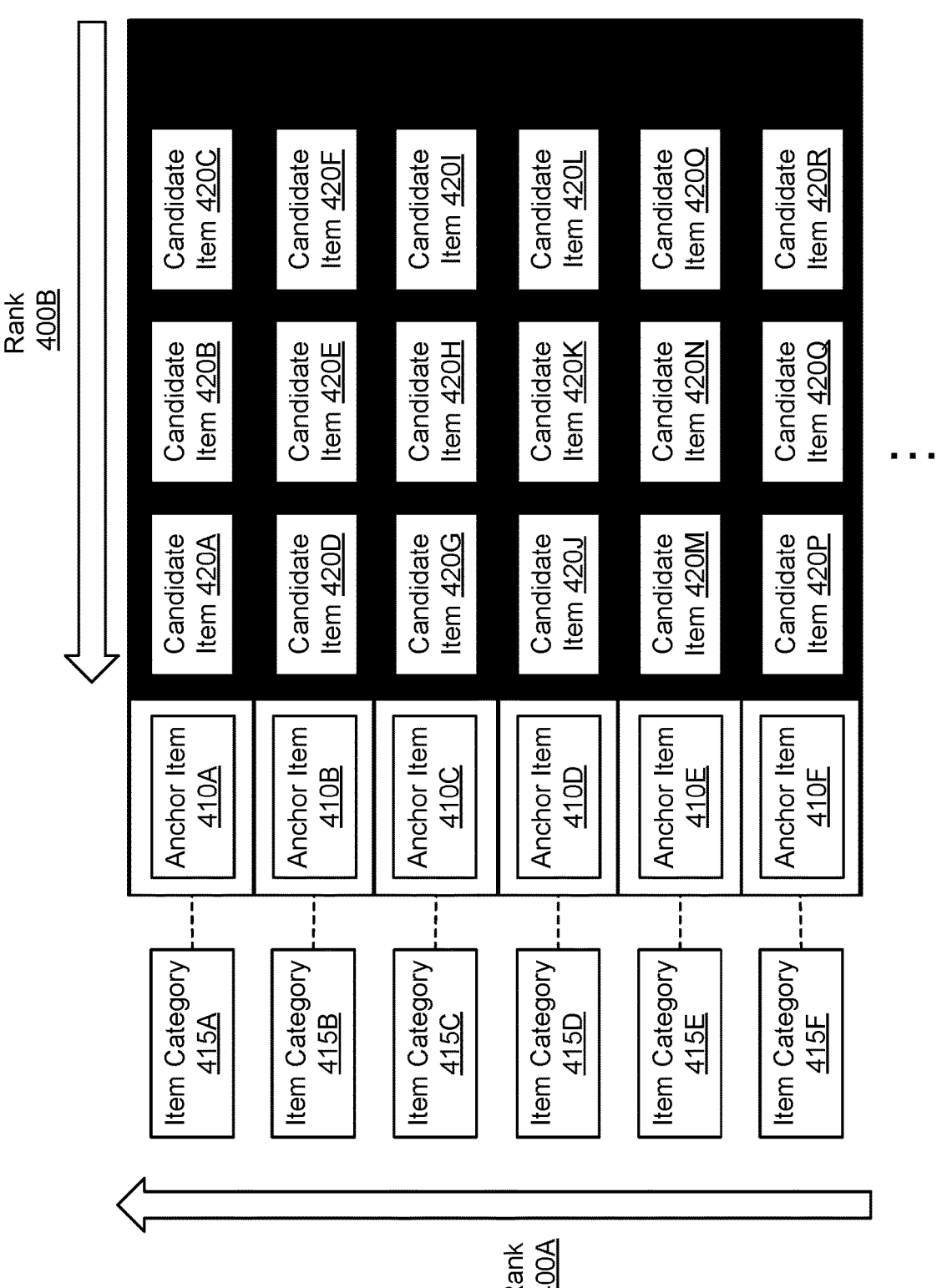
FIG. 4C illustrates an example of an ordering interface generated based on a category-based ranking of previously ordered items and an item-based ranking of replacement items, in accordance with one or more embodiments.

Referring again to FIG. 3, the online system 140 then generates 360 (e.g., using the interface module 211) the ordering interface based at least in part on the ranked set of item categories 415 associated with the set of anchor items 410 and the ranked set of candidate items 420 associated with each item category 415. The ranked set of item categories 415 and the ranked set of candidate items 420 may be arranged within the ordering interface along different axes so that they are perpendicular to each other. For example, the ranked set of item categories 415 may be arranged vertically in the ordering interface while the ranked set of candidate items 420 associated with each item category 415 may be arranged horizontally in the ordering interface, or vice versa. In some embodiments, the ranked set of item categories 415 and the ranked set of candidate items 420 may be arranged in presentation units (e.g., scrollable units, carousels, etc.) within the ordering interface. For example, the ranked set of item categories 415 may be arranged within a vertically scrollable unit within the ordering interface while the ranked set of candidate items 420 associated with each item category 415 may be arranged within a horizontally scrollable unit within the ordering interface, or vice versa. Furthermore, a position within the ordering interface occupied by an item category 415 or a candidate item 420 may be based on a rank 400 associated with the item category 415 or the candidate item 420. FIG. 4C illustrates an example of an ordering interface generated 260 based on a category-based ranking of previously ordered items and an item-based ranking of replacement items, in accordance with one or more embodiments, and continues the examples described above in conjunction with FIGS. 4A-4B. As shown in FIG. 4C, a position occupied by each item category 415 may be based on a rank 400A associated with the item category 415, such that item categories 415 associated with higher ranks 400A occupy more prominent positions within the ordering interface than item categories 415 associated with lower ranks 400A. Similarly, as shown in FIG. 4C, a position occupied by each candidate item 420 may be based on a rank 400B associated with the candidate item 420, such that candidate items 420 associated with higher ranks 400B occupy more prominent positions within the ordering interface than candidate items 420 associated with lower ranks 400B.

In embodiments in which a ranked set of item categories 415 and a ranked set of candidate items 420 are arranged along different axes within the ordering interface, the ranked set of item categories 415 and the ranked set of candidate items 420 may overlap. In such embodiments, each anchor item 410 associated with an item category 415 may occupy the most prominent position in the ordering interface associated with the item category 415. For example, as shown in FIG. 4C, suppose that each candidate item 420 associated with an item category 415 occupies a position of a horizontally scrollable unit within the ordering interface, in which a prominence of the position is based on a rank 400B associated with each candidate item 420, and positions further to the left are more prominent within the ordering interface than positions further to the right. In this example, an anchor item 410 associated with the item category 415 may occupy a leftmost position within the horizontally scrollable unit, a candidate item 420 with the highest rank 400B occupies the second-leftmost position, a candidate item 420 with the second-highest rank 400B occupies the third-leftmost position, etc. In embodiments in which item categories 415 are ranked 340 based on combined first scores 405A associated with anchor items 410, anchor items 410 associated with an item category 415 may occupy the most prominent positions in the ordering interface associated with the item category 415 (e.g., based on a first score 405A associated with each anchor item 410 computed 330 by the online system 140). In the above example, if two anchor items 410 are associated with the same item category 415, the anchor item 410 associated with the higher first score 405A may occupy the leftmost position, the anchor item 410 associated with the lower first score 405A may occupy the second-leftmost position, a candidate item 420 with the highest rank 400B may occupy the third-leftmost position, etc.

Figure 4D:
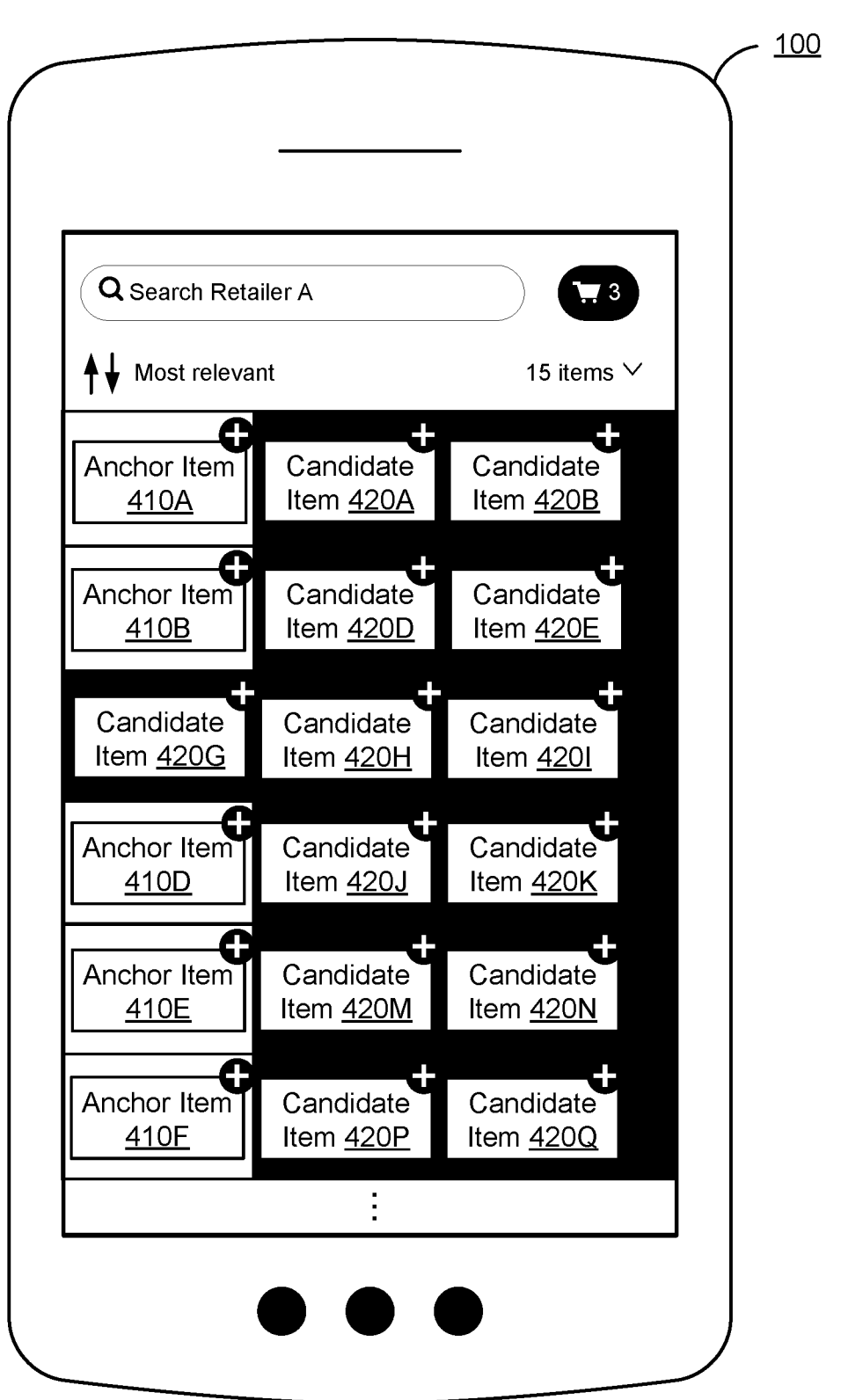
FIG. 4D illustrates an example of an ordering interface sent for display to a customer client device, in accordance with one or more embodiments.

Referring once more to FIG. 3, the online system 140 may then send 365 (e.g., using the interface module 211) the ordering interface for display to the customer client device 100 associated with the customer. In some instances, the online system 140 may also send one or more commands directing the customer client device 100 to display the ordering interface, which may, e.g., cause the customer client device 100 to display the ordering interface. FIG. 4D continues the example described above in conjunction with FIGS. 4A-4C and illustrates an example of an ordering interface sent 365 for display to a customer client device 100, in accordance with one or more embodiments. For example, the user interface on client device 100 show in FIG. 4D includes an arrangement of the ranked anchor items 410A-F in a vertical listing. The user interface further arranges the candidate items 420A-Q, which were selected based on their similarity to the corresponding anchor items 410A-F, next to their corresponding anchor items 410A-F. This way, the user is presented with rows of adjacent items that are highly similar, thereby providing a more intuitive and less noisy user interface for the user. As shown in the example of FIG. 4D, the ranked set of candidate items 420 associated with each item category 415 may be arranged within a horizontally scrollable unit, such that the customer may scroll to view positions further to the right to view candidate items 420G-I in the same item category 415C as anchor item 410C.

ADDITIONAL CONSIDERATIONS

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

32

What is claimed is:

1. A method comprising, at a computer system comprising a processor and a computer-readable medium:
receiving a request from a client device associated with a user of an online system to access an ordering interface associated with a retailer;
identifying a retailer location associated with the retailer based at least in part on a geographical location associated with the user;
applying a machine learning model to a set of attributes associated with each item of a plurality of items included among an inventory of the retailer to predict an availability of each item at the retailer location;
identifying a set of items included in one or more previous orders associated with the user and the retailer;
identifying, from the set of items, a set of anchor items associated with at least a threshold predicted availability at the retailer location;
computing a first score for each anchor item of the set of anchor items based at least in part on one or more of: an expected value associated with a corresponding anchor item or a likelihood that the user will order the corresponding anchor item again, wherein the expected value is based at least in part on a value associated with the corresponding anchor item and an interaction probability for the user with the corresponding anchor item;
determining an item category associated with each anchor item;
ranking a set of item categories associated with the set of anchor items based at least in part on the first score computed for each anchor item;
for each anchor item category of the set of item categories:
identifying a set of candidate items associated with a corresponding anchor item and at least the threshold predicted availability at the retailer location, and
computing a second score for each candidate item based at least in part on a satisfaction likelihood of the user with a corresponding candidate item as a replacement for an anchor item associated with the corresponding anchor item, and
ranking the set of candidate items to arrange the ranked set of item categories along a first axis and, for each item category, the ranked set of candidate items along a second axis perpendicular to the first axis, wherein within each item category the anchor item is displayed in a most prominent position and the candidate items are displayed in positions based on their second scores;
generating the ordering interface based at least in part on the ranked set of anchor items and the ranked set of candidate items; and
sending the ordering interface for display to the client device associated with the user, wherein sending the ordering interface for display to the client device associated with the user causes the client device associated with the user to display the ordering interface.

2. The method of claim 1, further comprising:
accessing an additional machine learning model trained to predict the interaction probability for the user with an item, wherein the additional machine learning model is trained based at least in part on historical interaction information for the user with one or more items; and
applying the additional machine learning model to a set of attributes associated with the user and an additional set of attributes associated with the corresponding anchor item to predict the interaction probability for the user with the corresponding anchor item.

3. The method of claim 1, wherein computing the second score for each candidate item comprises:

accessing an additional machine learning model trained to predict the interaction probability for the user with an item, wherein the additional machine learning model is trained based at least in part on historical interaction information for the user with one or more items;

applying the additional machine learning model to a set of attributes associated with the user and an additional set of attributes associated with the corresponding candidate item to predict the interaction probability for the user with the corresponding candidate item; and computing the second score for each candidate item based at least in part on one or more of: the expected value associated with the corresponding candidate item or the satisfaction likelihood of the user with the corresponding candidate item as a replacement for the anchor item associated with the corresponding anchor item, wherein the expected value is based at least in part on the value associated with the corresponding candidate item and the interaction probability for the user with the corresponding candidate item.

4. The method of claim 1, wherein ranking the set of anchor items comprises:

applying a trained machine-learning model to a set of features about the anchor item to generate the likelihood that the user will order the corresponding anchor.

5. The method of claim 1, further comprising:

accessing an additional machine learning model trained to predict the likelihood that the user will order an item again, wherein the additional machine learning model is trained based at least in part on historical order information associated with the user; and applying the additional machine learning model to a set of attributes associated with the user and an additional set of attributes associated with each anchor item of the set of anchor items to predict the likelihood that the user will order the corresponding anchor item again.

6. The method of claim 1, wherein computing the second score for each candidate item comprises:

accessing an additional machine learning model trained to predict the satisfaction likelihood of the user with a candidate item as a replacement for an item, wherein the additional machine learning model is trained based at least in part on historical user satisfaction information associated with one or more users of the online system; and applying the additional machine learning model to a first set of attributes associated with the user, a second set of attributes associated with the corresponding candidate item, and a third set of attributes associated with the anchor item to predict the satisfaction likelihood of the user with the corresponding candidate item as the replacement for the anchor item.

7. The method of claim 1, wherein the ranked set of anchor items is arranged vertically in the ordering interface and the ranked set of candidate items for each anchor item is arranged horizontally in the ordering interface.

8. The method of claim 1, wherein each anchor item occupies a position of a vertically scrollable unit within the ordering interface and a prominence of the position is based at least in part on a rank associated with each anchor item.

9. The method of claim 1, wherein each candidate item occupies a position of a horizontally scrollable unit within the ordering interface and a prominence of the position is based at least in part on a rank associated with each candidate item, and each anchor item of the set of anchor items occupies a most prominent position of the horizontally scrollable unit within the ordering interface.

10. A computer program product comprising a non-transitory computer-readable storage medium having instructions encoded thereon that, when executed by a processor, cause the processor to perform steps comprising:

receiving a request from a client device associated with a user of an online system to access an ordering interface associated with a retailer;

identifying a retailer location associated with the retailer based at least in part on a geographical location associated with the user;

applying a machine learning model to a set of attributes associated with each item of a plurality of items included among an inventory of the retailer to predict an availability of each item at the retailer location;

identifying a set of items included in one or more previous orders associated with the user and the retailer;

identifying, from the set of items, a set of anchor items associated with at least a threshold predicted availability at the retailer location;

computing a first score for each anchor item of the set of anchor items based at least in part on one or more of: an expected value associated with a corresponding anchor item or a likelihood that the user will order the corresponding anchor item again, wherein the expected value is based at least in part on a value associated with the corresponding anchor item and an interaction probability for the user with the corresponding anchor item;

determining an item category associated with each anchor item;

ranking a set of item categories associated with the set of anchor items based at least in part on the first score computed for each anchor item;

for each anchor item category of the set of item categories:

identifying a set of candidate items associated with a corresponding anchor item and at least the threshold predicted availability at the retailer location, and computing a second score for each candidate item based at least in part on a satisfaction likelihood of the user with a corresponding candidate item as a replacement for an anchor item associated with the corresponding anchor item, and ranking the set of candidate items to arrange the ranked set of item categories along a first axis and, for each item category, the ranked set of candidate items along a second axis perpendicular to the first axis, wherein within each item category the anchor item is displayed in a most prominent position and the candidate items are displayed in positions based on their second scores;

generating the ordering interface based at least in part on the ranked set of anchor items and the ranked set of candidate items; and sending the ordering interface for display to the client device associated with the user, wherein sending the ordering interface for display to the client device associated with the user causes the client device associated with the user to display the ordering interface.

11. The computer program product of claim 10, wherein the computer-readable storage medium further has instructions encoded thereon that, when executed by the processor, cause the processor to perform steps comprising:

accessing an additional machine learning model trained to predict the interaction probability for the user with an item, wherein the additional machine learning model is trained based at least in part on historical interaction information for the user with one or more items; and applying the additional machine learning model to a set of attributes associated with the user and an additional set of attributes associated with the corresponding anchor item to predict the interaction probability for the user with the corresponding anchor item.

12. The computer program product of claim 10, wherein computing the second score for each candidate item comprises:

accessing an additional machine learning model trained to predict the interaction probability for the user with an item, wherein the additional machine learning model is trained based at least in part on historical interaction information for the user with one or more items;

applying the additional machine learning model to a set of attributes associated with the user and an additional set of attributes associated with the corresponding candidate item to predict the interaction probability for the user with the corresponding candidate item; and computing the second score for each candidate item based at least in part on one or more of: the expected value associated with the corresponding candidate item or the satisfaction likelihood of the user with the corresponding candidate item as a replacement for the anchor item associated with the corresponding anchor item, wherein the expected value is based at least in part on the value associated with the corresponding candidate item and the interaction probability for the user with the corresponding candidate item.

13. The computer program product of claim 10, wherein ranking the set of anchor items comprises:

applying a trained machine-learning model to a set of features about the anchor item to generate the likelihood that the user will order the corresponding anchor.

14. The computer program product of claim 10, wherein the computer-readable storage medium further has instructions encoded thereon that, when executed by the processor, cause the processor to perform steps comprising:

accessing an additional machine learning model trained to predict the likelihood that the user will order an item again, wherein the additional machine learning model is trained based at least in part on historical order information associated with the user; and applying the additional machine learning model to a set of attributes associated with the user and an additional set of attributes associated with each anchor item of the set of anchor items to predict the likelihood that the user will order the corresponding anchor item again.

15. The computer program product of claim 10, wherein computing the second score for each candidate item comprises:

accessing an additional machine learning model trained to predict the satisfaction likelihood of the user with a candidate item as a replacement for an item, wherein the additional machine learning model is trained based at least in part on historical user satisfaction information associated with one or more users of the online system; and applying the additional machine learning model to a first set of attributes associated with the user, a second set of attributes associated with the corresponding candidate item, and a third set of attributes associated with the anchor item to predict the satisfaction likelihood of the user with the corresponding candidate item as the replacement for the anchor item.

16. The computer program product of claim 10, wherein the ranked set of anchor items is arranged vertically in the ordering interface and the ranked set of candidate items for each anchor item is arranged horizontally in the ordering interface.

17. The computer program product of claim 10, wherein each anchor item occupies a position of a vertically scrollable unit within the ordering interface and a prominence of the position is based at least in part on a rank associated with each anchor item.

18. The computer program product of claim 10, wherein each candidate item occupies a position of a horizontally scrollable unit within the ordering interface and a prominence of the position is based at least in part on a rank associated with each candidate item, and each anchor item of the set of anchor items occupies a most prominent position of the horizontally scrollable unit within the ordering interface.

19. A computer system comprising:

a processor; and a non-transitory computer-readable storage medium storing instructions that, when executed by the processor, perform actions comprising:

receiving a request from a client device associated with a user of an online system to access an ordering interface associated with a retailer;

identifying a retailer location associated with the retailer based at least in part on a geographical location associated with the user;

applying a machine learning model to a set of attributes associated with each item of a plurality of items included among an inventory of the retailer to predict an availability of each item at the retailer location;

identifying a set of items included in one or more previous orders associated with the user and the retailer;

identifying, from the set of items, a set of anchor items associated with at least a threshold predicted availability at the retailer location;

computing a first score for each anchor item of the set of anchor items based at least in part on one or more of: an expected value associated with a corresponding anchor item or a likelihood that the user will order the corresponding anchor item again, wherein the expected value is based at least in part on a value associated with the corresponding anchor item and an interaction probability for the user with the corresponding anchor item;

determining an item category associated with each anchor item;

ranking a set of item categories associated with the set of anchor items based at least in part on the first score computed for each anchor item;

for each anchor item category of the set of item categories:

identifying a set of candidate items associated with a corresponding anchor item and at least the threshold predicted availability at the retailer location, and computing a second score for each candidate item based at least in part on a satisfaction likelihood of the user with a corresponding candidate item as a replacement for an anchor item associated with the corresponding anchor item, and ranking the set of candidate items to arrange the ranked set of item categories along a first axis and, for each item category, the ranked set of candidate items along a second axis perpendicular to the first axis, wherein within each item category the anchor item is displayed in a most prominent position and the candidate items are displayed in positions based on their second scores;

generating the ordering interface based at least in part on the ranked set of anchor items and the ranked set of candidate items; and sending the ordering interface for display to the client device associated with the user, wherein sending the ordering interface for display to the client device associated with the user causes the client device associated with the user to display the ordering interface.

20. The method of claim 1, wherein ranking the set of item categories is further based on information describing a current shopping session of the user.

* * * * *